(12) United States Patent
Iannelli

(10) Patent No.: US 8,023,830 B2
(45) Date of Patent: Sep. 20, 2011

(54) EXTERNALLY MODULATED LASER OPTICAL TRANSMISSION SYSTEM WITH FEED FORWARD NOISE CANCELLATION

(75) Inventor: John Iannelli, San Marino, CA (US)

(73) Assignee: Emcore Corporation, Albuquerque, NM (US)

( * ) Notice: Subject to any disclaimer, the term of this patent is extended or adjusted under 35 U.S.C. 154(b) by 0 days.

(21) Appl. No.: 12/848,683

(22) Filed: Aug. 2, 2010

(65) Prior Publication Data

US 2011/0020005 A1 Jan. 27, 2011

Related U.S. Application Data

(63) Continuation of application No. 11/729,255, filed on Mar. 28, 2007, now Pat. No. 7,792,432, which is a continuation-in-part of application No. 11/701,742, filed on Feb. 2, 2007, now Pat. No. 7,848,661, which is a continuation-in-part of application No. 11/366,936, filed on Mar. 2, 2006, now Pat. No. 7,881,621.

(51) Int. Cl.
*H04B 10/04* (2006.01)

(52) U.S. Cl. .......... 398/182; 398/183; 398/188

(58) Field of Classification Search .......... 398/182–201
See application file for complete search history.

(56) References Cited

U.S. PATENT DOCUMENTS

| | | | |
|---|---|---|---|
| 3,794,841 A | 2/1974 | Cosentino et al. | |
| 4,156,206 A | 5/1979 | Comerford et al. | |
| 4,466,694 A | 8/1984 | MacDonald | |
| 4,704,720 A | 11/1987 | Yamaguchi | |
| 4,786,132 A | 11/1988 | Gordon | |
| 4,805,235 A | 2/1989 | Henmi | |
| 4,847,477 A * | 7/1989 | Smith | 250/201.9 |
| 4,992,754 A | 2/1991 | Blauvelt et al. | |
| 5,003,546 A | 3/1991 | Lidgard et al. | |
| 5,132,639 A | 7/1992 | Blauvelt et al. | |
| 5,161,044 A | 11/1992 | Nazarathy et al. | |
| 5,172,068 A | 12/1992 | Childs | |
| 5,227,736 A | 7/1993 | Tucker et al. | |
| 5,252,930 A | 10/1993 | Blauvelt | |
| 5,257,124 A | 10/1993 | Glaab et al. | |
| 5,303,079 A | 4/1994 | Gnauck et al. | |
| 5,325,225 A | 6/1994 | Suzaki et al. | |
| 5,340,980 A | 8/1994 | Bianchini et al. | |

(Continued)

FOREIGN PATENT DOCUMENTS

JP 2002-317451 10/2002

OTHER PUBLICATIONS

Agrawal, "Fiber-Optic Communication Systems", 2nd ed., 1997, pp. 39-63, 138-154, 163-175, 244-251, 261-271, and 441-447; John Wiley & Sons, Inc., New York, NY.

(Continued)

*Primary Examiner* — Dzung Tran

(57) ABSTRACT

An optical transmitter for generating a modulated optical signal for transmission over a fiber optic link to a remote receiver including a laser; a modulator for externally modulating the optical output signal with a RF signal to produce an optical signal including a modulated information-containing component; and a phase modulator coupled either to the output of the modulator or directly to the output of the laser for reducing or canceling the noise signals generated in the laser.

18 Claims, 3 Drawing Sheets

U.S. PATENT DOCUMENTS

| | | | |
|---|---|---|---|
| 5,359,412 A | 10/1994 | Schulz | |
| 5,373,389 A | 12/1994 | Huber | |
| 5,424,680 A | 6/1995 | Nazarathy et al. | |
| 5,430,569 A | 7/1995 | Blauvelt et al. | |
| 5,436,749 A | 7/1995 | Pidgeon et al. | |
| 5,453,867 A | 9/1995 | Ohya et al. | |
| 5,453,868 A * | 9/1995 | Blauvelt et al. | 398/199 |
| 5,485,481 A | 1/1996 | Ventrudo et al. | |
| 5,500,758 A | 3/1996 | Thompson et al. | |
| 5,524,076 A | 6/1996 | Rolland et al. | |
| 5,546,281 A | 8/1996 | Poplawski et al. | |
| 5,663,823 A | 9/1997 | Suzuki et al. | |
| 5,699,179 A | 12/1997 | Gopalakrishnan | |
| 5,717,533 A | 2/1998 | Poplawski et al. | |
| 5,717,804 A | 2/1998 | Pan et al. | |
| 5,778,113 A | 7/1998 | Yu | |
| 5,798,854 A | 8/1998 | Blauvelt et al. | |
| 5,812,294 A | 9/1998 | Wilson | |
| 5,812,716 A | 9/1998 | Ohishi | |
| 5,828,477 A | 10/1998 | Nilsson et al. | |
| 5,845,030 A | 12/1998 | Sasaki et al. | |
| 5,850,305 A | 12/1998 | Pidgeon | |
| 5,870,417 A | 2/1999 | Verdiell et al. | |
| 5,917,642 A | 6/1999 | O'Donnell et al. | |
| 5,991,471 A | 11/1999 | Yu | |
| 6,002,816 A | 12/1999 | Penninckx et al. | |
| 6,078,418 A | 6/2000 | Hansen et al. | |
| 6,091,864 A | 7/2000 | Hofmeister | |
| RE36,820 E | 8/2000 | McGinley et al. | |
| 6,104,851 A | 8/2000 | Mahgerefteh | |
| 6,122,085 A | 9/2000 | Bitler | |
| 6,179,627 B1 | 1/2001 | Daly et al. | |
| 6,207,950 B1 | 3/2001 | Verdielli | |
| 6,220,873 B1 | 4/2001 | Samela et al. | |
| 6,246,965 B1 | 6/2001 | Cockerham et al. | |
| 6,252,693 B1 * | 6/2001 | Blauvelt | 398/194 |
| 6,288,814 B1 | 9/2001 | Blauvelt | |
| 6,304,353 B1 | 10/2001 | Gehlot | |
| 6,356,679 B1 | 3/2002 | Kapany | |
| 6,363,187 B1 | 3/2002 | Fells et al. | |
| 6,373,644 B1 | 4/2002 | Flanders | |
| 6,416,937 B1 | 7/2002 | Flanders et al. | |
| 6,446,867 B1 | 9/2002 | Sanchez | |
| 6,480,513 B1 | 11/2002 | Kapany et al. | |
| 6,501,867 B2 | 12/2002 | Gates, II et al. | |
| 6,517,382 B2 | 2/2003 | Flickinger et al. | |
| 6,519,270 B1 | 2/2003 | Kim et al. | |
| 6,519,374 B1 | 2/2003 | Stook et al. | |
| 6,535,315 B1 | 3/2003 | Way et al. | |
| 6,538,789 B2 | 3/2003 | Sun | |
| 6,650,458 B1 | 11/2003 | Prosyk | |
| 6,654,564 B1 | 11/2003 | Colbourne et al. | |
| 6,661,814 B1 | 12/2003 | Chapman et al. | |
| 6,661,815 B1 | 12/2003 | Kozlovsky et al. | |
| 6,741,393 B1 | 5/2004 | Neumann et al. | |
| 6,741,761 B2 | 5/2004 | Sharp | |
| 6,760,142 B2 | 7/2004 | Leuthold et al. | |
| 6,788,424 B1 | 9/2004 | Bussard et al. | |
| 6,795,595 B2 | 9/2004 | Gopalakrishnan | |
| 6,832,050 B1 | 12/2004 | Clausen | |
| 6,856,770 B2 | 2/2005 | Bai | |
| 6,864,414 B2 | 3/2005 | Sharps et al. | |
| 6,941,045 B2 | 9/2005 | Doerr | |
| 6,961,492 B2 | 11/2005 | Doerr | |
| 6,963,685 B2 | 11/2005 | Mahgerefteh et al. | |
| 7,058,314 B1 | 6/2006 | Clausen et al. | |
| 7,071,407 B2 | 7/2006 | Faterni et al. | |
| 7,088,875 B2 | 8/2006 | Sugiyama et al. | |
| 7,099,597 B2 | 8/2006 | Saunders et al. | |
| 7,115,811 B2 | 10/2006 | Ho et al. | |
| 7,116,913 B2 | 10/2006 | Miyauchi et al. | |
| 7,170,914 B2 | 1/2007 | Narayan | |
| 7,171,076 B2 | 1/2007 | Shibata | |
| 7,466,925 B2 * | 12/2008 | Iannelli | 398/182 |
| 7,792,432 B2 * | 9/2010 | Iannelli | 398/182 |
| 7,853,155 B2 * | 12/2010 | Krieg | 398/198 |
| 7,881,621 B2 * | 2/2011 | Iannelli | 398/192 |
| 2001/0015843 A1 | 8/2001 | Miyauchi et al. | |
| 2002/0005970 A1 | 1/2002 | Lang | |
| 2002/0039217 A1 | 4/2002 | Saunders et al. | |
| 2002/0171894 A1 | 11/2002 | Sun | |
| 2003/0002112 A1 | 1/2003 | Hirano et al. | |
| 2003/0016415 A1 | 1/2003 | Jun et al. | |
| 2003/0185573 A1 | 10/2003 | Fells | |
| 2004/0076199 A1 | 4/2004 | Wipiejewski et al. | |
| 2005/0025500 A1 | 2/2005 | Hallemeier et al. | |
| 2005/0036792 A1 | 2/2005 | Frederikson et al. | |
| 2005/0220458 A1 | 10/2005 | Kupershmidt et al. | |
| 2005/0271396 A1 | 12/2005 | Iannelli | |
| 2005/0281298 A1 | 12/2005 | Kupershmidt et al. | |
| 2006/0078336 A1 | 4/2006 | McNicol et al. | |
| 2006/0109877 A1 | 5/2006 | Caton et al. | |
| 2007/0098414 A1 | 5/2007 | Zhou | |

OTHER PUBLICATIONS

Agrawal, "Nonlinear Fiber Optics", 1989, pp. 51-83, 180-185, 263-273, and 283-286, Academic Press, San Diego, CA.

Aoki et al., "Input Power Limits of Single Mode Optical Fibers Due to Stimulated Brillouin Scattering in Optical Communications Systems", J. Lightware, 1988.

Bergmann et al., "Dispersion-Induced Composite Second-Order Distortion at 1.5 μm", IEEE Photo. Technol. Lett., 3:59-61, 1991.

Bertelsmeier et al., "Linearization of Broadband Optical Transmission Systems by Adaptive Predistortion", Frequenz, 38(9), pp. 206-212, 1984.

Bird, D.M. et al., "Narrow Line Semiconductor Laser Using Fibre Grating", Electronic Letters, vol. 27, Issue 13, Jun. 20, 1991, pp. 1115-1116.

Bolle et al., "Brillouin Gain Curve Dependence on Frequency Spectrum of PSK-modulated Signals", Electronics Lett., 25(1):2-3, 1989.

Bolle et al., "Influence of phase modulation on the Brillouin gain curve", Proceedings of the 24th European Conference on Optical Communication, pp. 119-122, 1988.

Bose et al., "Introductory Network Theory", New York: Harper & Row, Weatherhill, pp. 176-187 (1965).

Chou et al., "Single-tone and two-tone AM-FM spectral calculations for tunable diode laser absorption spectroscopy", Appi. Opt., 26(17):3584-3587 (1987).

Chraplyvy, "Limitations on Lightwave Communications Imposed by Optical-Fiber Nonlinearities", J. Lightwave Technol., 8(10):1548-1557 (1990).

Cotter, "Observation of Stimulated Brillouin Scattering in Low-loss Silica Fibre at 1.3 m", Electronics Lett., 18(12):495-496 (1982).

Cotter, "Suppression of Stimulated Brillouin Scattering During Transmission of High-Power Narrowband Laser Light in Monomode Fibre", Electronics Lett., 1 8(15):638-640 (1982).

Cotter, "Transient Stimulated Brillouin Scattering in Long Single-Mode Fibres", Electronics Lett., 18(12):504-508 (1982).

Darcie et al., "Fiber-Reflection-Induced Impairments in Lightwave AM-VSB CATV Systems", J. Lightwave Technol., 9:991-5 (1991).

Davis et al., "Scheme for Negating the Stimulated Brillouin Scattering Power Limit in Remotely interrogated Interferometric Fiber Sensor Arrays", Proceedings of the SPIE, 2071:112-119 (1993).

Dixit, "Numerical Modeling of Suppression of Stimulated Brillouin Scattering Due to Finite Laser Bandwidth", Proc. of the SPIE, 1626:254-265 (1992).

Eskildsen et al., "Stimulated Brillouin scattering suppression with low residual AM using a novel temperature wavelength-dithered DFB laser diode", Electronics Lett.,32(15): 1387-1389 (1996).

Analog Devices Design-In Reference Manual showing 250MHz, Voltage Output 4-Quadrant Multiplier (3 pp.) (1994).

Fishman et al., "Degradations Due to Stimulated Brillouin Scattering in Multigigabit Intensity-Modulated Fiber-Optic Systems", J. Lighiwave Technol., 1 1(1 I):1721-1728 (1993).

Fishman et al., "Transmitter and Receiver Design for Amplified Lightwave Systems", Chapter 3 in: Kaminow et al. (eds.), Optical Fiber Telecommunications IJIB, San Diego, CA: Academic Press, pp. 69-94, 117-126, 377-420 (1997).

Gilbert, "A Precise Four-Quadrant Multiplier with Subnanosecond Response", IEEE J. Solid-State Circuits, 3(4) :365-373 (1968).

Harrison et al., "Stimulated Brillouin Scattering", Chapter 1 (pp. 1-11) TN: Pike et al. (eds.), Scattering: Scattering and Inverse Scattering in Pure and Applied Science, Academic Press (2001).

International Search Report mailed Dec. 16, 2008, for PCT Application No. PCT/US2008/005547 filed Apr. 29, 2008, 11 pages.

Kartalopoulos, "DWDM Networks, Devices and Technology", IEEE Press, pp. 77, 105, 110, 125, 129, 154, 172-186, and 306-307 (2003).

Kuo et al., "Erbium-Doped Fiber Amplifier Second-Order Distortion in Analog Links and Electronic Compensation", IEEE Photo. Technol. Lett., 3:829-3 1 (1991).

Kuo et al., "Fundamental Second-Order Nonlinear Distortions in Analog AM CATV Transport Systems Based on Single Frequency Semiconductor Lasers", J. Lightwave Technol., 10:235-43 (1992).

Labudde et al., "Transmission of Narrow Band High Power Laser Radiation Through Optical Fibers", Opt. Comm., 32(3):385-390 (1980).

Lidgard et al., "Generation and Cancellation of Second-Order Harmonic Distortion in Analog Optical Systems by Interferometric FM-AM Conversion", IEEE Photo. Technol. Lett., 2:519-21 (1990).

Lotem, "Extension of the Spectral Coverage Range of Frequency Modulation Spectroscopy by Double Frequency Modulation", J. Appi. Phys., 54(10):6033-6035 (1983).

Mao et al., "Brillouin scattering in externally modulated lightwave AM-VSB CATV transmission systems", IEEE Photon. Technol. Lett., 4(3):287-289 (1992).

Milburn et al., "Optical-fiber media for squeezed-state generation", J. Opt. Soc. Am. B., 4(10):1476-1489 (1987).

Muys et al., "A 50-channel externally modulated AM-VSB video distribution system with three cascaded EDFA's providing 50-dB power budget over 30 km of standard single-mode fiber", IEEE Photon. Technol. Let!., 7(6):691-693 (1995).

Nagarajan et al., "Millimeter Wave Narrowband Optical Fiber Links Using External Cavity Semiconductor Lasers", J. Lightwave Technol., 12: 127-36 (1994).

Nilsson, Electric Circuits, 4th ed., Addison-Wesley Publishing Co., pp. 372-388 (1993).

Park et al., "Single-Mode Behavior of a Multimode 1.55 um Laser With a Fire Grating External Cavity", Electronics Lett., 22:1132-3 (1986).

Pavesi et al., "Role of Point Defects in the Silicon Diffusion in GaAs and Al(0.3)Ga(0.7) As and in the Related Superlattice Disordering", J. Appi. Phys., 71(5):2225-2237 (1992).

Ramaswami et al. (eds.), Optical Networks: A Practical Perspective, 2nd ed., San Diego, CA: Academic Press, pp. 76-90, 186-197 (2002).

Senturia et al., Electronic Circuits and Applications, New York: Wiley and Sons, pp. 471-497 and 549-573 (1975).

Smith, "Optical Power Handling Capacity of Low Loss Optical Fibers as Determined by Stimulated Raman and Brillouin Scattering," Appl. Opt., 11(11):2489-2494 (1972).

Stolen, "Nonlinearity in Fiber Transmission", Proc. of the IEEE, 68(10):1232-1236 (1980).

Sugie et al., "A Novel Repeaterless CPFSK Coherent Lightwave System Employing an Optical Booster Amplifier", J. Lightwave Technol., 9(9):1178-1186 (1991).

Sugie, "Suppression of SBS by discontinuous Brillouin frequency shifted fibre in CPFSK coherent lightwave system with booster amplifier", Electronics Lett., 27(14): 1231-1233 (1991).

Sykes, "External-Cavity Diode Lasers for Ultra-Dense WDM Networks", Lightwave (Mar. 2001).

Thomas et al., "Normal Acoustic Modes and Brillouin Scattering in Single-Mode Optical Fibers", Phys. Rev. B, 19(10):4986-4998 (1979).

Wedlock et al., "Electronic Components and Measurements," Englewood Cliffs, NJ: Prentice-Hall Inc., pp. 225-239 (1969).

Whalen et al., "Tunable Fibre-Extended-Cavity Laser", Electronics Lett., 23:313-4 (1987).

Wyatt et al., "10 kHz Linewidth 1.5im InGaAsP External Cavity Laser with 55nm Tuning Range", Electronic Lett., 19:110-2 (1983).

Yariv, "Optical Communications in Modern Communications, 5th ed., The Oxford Series in Electrical and Computer Engineering", Oxford University Press, pp. 294-344 (1997).

Yariv, "Optical Electronics", 3rd ed., New York: Holt, Rinehart and Winston (1985).

Yu et al., "A Model of Si Diffusion in GaAs Based on the Effect of the Fermi Level", J. Appi. Phys., 66(7):2952-2961 (1989).

Ziari et al., "High-Speed Fiber-Grating-Coupled Semiconductor Wavelength-Division ' Multiplexed Laser", LEO '97, paper CMGI, p. 27 (Baltimore, Maryland) (May 20-22, 1997).

Anonymous (2006), "Electro-optic modulator," located at, <http://en.wikipedia.org/wiki/Electro-optic_modulator>, last visited on Aug. 25, 2010.

Anonymous (2006), "General Photonics Corporation—LiNbO3 Phase Modulator," located at <http://www.generalphotonics.com/GP%20Modulator.htm>, last visited on Feb. 24, 2009.

Dye, S. (Nov.-Dec. 1995). "Mach-Zehnder External Modulator Linearization Techniques," International Journal of Optoelectronics 1 0(6):455-459.

Griffin, R.A. et al. (1999), "Radio-Over-Fiber Distribution Using an Optical Millimeter-Wave/DWDM Overlay," Optical Fiber Communication Conference, 1999, and the International Conference on Integrated Optics and Optical Fiber Communication. CFC/OOC '99, San Diego, CA. Feb. 21-26, 1999, 2:WD6-1-WD6-3.

Non-Final Office Action from U.S. Appl. No. 11/366,936, mailed Jun. 8, 2010.

Final Office Action from U.S. Appl. No. 11/366,936 mailed Apr. 1, 2010.

Non-Final Office Action from U.S. Appl. No. 11/366,936 mailed Sep. 16, 2009.

Non-Final Office Action from U.S. Appl. No. 11/366,936, mailed Mar. 18, 2009.

Non-Final Office Action from U.S. Appl. No. 11/701,742, mailed May 27, 2010.

Final Office Action from U.S. Appl. No. 11/701,742, mailed Mar. 17, 2010.

Non-Final Office Action from U.S. Appl. No. 11/701,742, mailed Sep. 15, 2009.

Final Office Action from U.S. Appl. No. 11/729,255, mailed Mar. 17, 2010.

Non-Final Office Action from U.S. Appl. No. 11/729,255, mailed Sep. 17, 2009.

Coldren, Larry A. et al., "External-Cavity Laser Design", Journal of Lightwave Technology, Dec. 1984, pp. 1045-1051, vol. LT-2.

* cited by examiner

EXTERNALLY MODULATED LASER OPTICAL TRANSMISSION SYSTEM WITH FEED FORWARD NOISE CANCELLATION

REFERENCE TO RELATED APPLICATIONS

This application is a continuation of U.S. application Ser. No. 11/729,255 filed on Mar. 28, 2007 now U.S. Pat. No. 7,792,432, which is a continuation-in-part of U.S. patent application Ser. No. 11/366,936 filed Mar. 2, 2006 now U.S Pat. No. 7,881,621, and U.S. patent application Ser. No. 11/701,742 filed Feb. 2, 2007 now U.S. Pat. No. 7,848,661.

This application is also related to U.S. patent application Ser. No. 10/946,056 filed Sep. 21, 2004, and assigned to the common assignee.

BACKGROUND OF THE INVENTION

1. Field of the Invention

This invention relates to an optical transmission system for analog or digital signals, and in particular to a system using an externally modulated solid-state laser. Moreover, the invention relates to the cancellation of noise components in the system arising from a number of possible sources such as Brownian motion of charge carriers within the semiconductor laser (white noise) or noise arising from fluctuations in the bias current or the thermal environment of the laser (which varies inversely with frequency and therefore is typically referred to as "1/f" noise).

2. Description of the Related Art

Directly modulating the analog intensity of a light-emitting diode (LED) or semiconductor laser with an electrical signal is considered among the simplest methods known in the art for transmitting analog signals, such as voice and video signals, on optical fibers. Although such analog transmission techniques have the advantage of substantially smaller bandwidth requirements than digital transmission, such as digital pulse code modulation, or analog or pulse frequency modulation, the use of amplitude modulation typically places more stringent requirements on the noise and distortion characteristics of the transmitter.

For these reasons, direct modulation techniques have been used in connection with 1310 nm lasers where the application is to short transmission links that employ fiber optic links with zero dispersion. For applications in metro and long haul fiber transmission links, the low loss of the link requires that externally modulated 1550 nm lasers be used, typically over very long distances (100 km) and high frequencies (over 900 MHz). A limiting factor in such links can be the conversion of residual phase noise from the laser which is converted into amplitude noise via the dispersion present in the fiber link. The present invention is therefore addressed to the problem of providing a simple and low cost system for noise cancellation associated with the phase noise of a laser so that the analog optical output can be used in metro and long haul optical networks, especially for analog transmission of broadband RF signals.

Direct current modulation of lasers is also known for use in digital optical transmission systems such as dense wavelength division multiplexing (DWDM) systems. See, for example, Kartalopoulos, DWDM Networks, Devices, and Technology (IEEE Press, 2003), p. 154.

In addition to the low noise characteristics required for an analog optical transmission system at 1550 nm, the system must be highly linear. Distortion inherent in certain analog transmitters prevents a linear electrical modulation signal from being converted linearly to an optical signal, and instead causes the signal to become distorted. These effects are particularly detrimental to multi-channel video transmission, which requires excellent linearity to prevent channels from interfering with each other. A highly linearized analog optical system has wide application in commercial analog systems, such as broadcast TV transmission, CATV, interactive TV, and video telephone transmission.

As an alternative to direct current modulation, external modulators of a continuous wave (CW) laser are known in the prior art for use in optical transmission systems. U.S. Pat. No. 5,699,179 describes an externally modulated, feedforward linearized analog optical transmitter for reducing the fiber-induced composite second order (CSO) distortion components.

Linearization of optical and other nonlinear transmitters has been studied for some time, but proposed solutions suffer from practical disadvantages. Most applications discussed above have bandwidths which are too large for many practical implementations. Feedforward techniques for linearization require complex system components such as optical power combiners and multiple optical sources. Quasi-optical feedforward techniques suffer from similar complexity problems and further require extremely well matched parts. However as discussed below, feedforward techniques for phase noise cancellation are practical techniques that can be implemented using many well developed technologies.

Prior to the present invention, there has not been an application of a phase modulator coupled to an externally modulated laser for the purpose of canceling phase noise components arising from the various noise sources in the semiconductor structure of the laser. It should be noted that semiconductor lasers exhibit noise in both their amplitude (often referred to as relative intensity noise) and their phase. These noise properties are essentially independent of the lasing wavelength, although the noise can manifest itself differently at different wavelengths in single mode fiber transmission. The primary internal mechanism leading to phase and amplitude noise is spontaneous emission within the active region of the laser. Since spontaneously emitted photons have no particular phase relationship to those photons produced via stimulated emission, both the amplitude and the phase of the resultant optical field are affected. The process of spontaneous emission is well understood and has been shown to be described by a Brownian motion process in which the noise spectrum is essentially constant (white noise) within the frequencies of operation. External to the laser, environmental effects such as micro-phonics, temperature fluctuations, and bias current noise can also produce phase noise in the optical field. These events typically lead to optical phase noise which exhibits a noise spectrum with a "1/f" dependence.

The present invention seeks to minimize the inherent phase noise from the semiconductor laser through feedforward cancellation regardless of the driving mechanism of the noise.

SUMMARY OF INVENTION

1. Objects of the Invention

It is an object of the present invention to provide an improved optical transmission system using an externally modulated laser.

It is another object of the present invention to compensate for noise in a laser used in an optical transmission system.

It is also another object of the present invention to provide an external phase modulator for use in an externally modulated 1550 nm analog optical transmission system to improve phase noise reduction.

It is still another object of the present invention to provide a highly linear optical transmission system suitable for long haul dispersive optical fiber media using an externally modulated laser together with a phase corrective circuit and a phase modulator coupled to the optical signal.

It is still another object of the present invention to provide a phase shifting circuit for reducing the residual phase noise from an externally modulated laser in an analog optical transmission system suitable for long haul dispersive optical fiber media.

It is also an object of the present invention to provide a phase noise compensation process in a broadband analog optical transmission system.

Some implementations or embodiments may achieve fewer than all of the foregoing objects.

2. Features of the Invention

Briefly, and in general terms, the present invention provides an optical transmitter for generating a modulated optical signal for transmission over a fiber optic link to a remote receiver, including a laser; a modulator for externally modulating the laser with a RF signal to produce an optical signal including a modulated information-containing component; and a phase modulator coupled to the output of the modulator for canceling the noise signals generated in the laser.

In another aspect, the present invention provides an optical transmitter for generating a modulated optical signal for transmission over a dispersive fiber optic link to a remote receiver having a semiconductor laser for producing an optical signal with associated phase noise; a noise cancellation circuit coupled to the output of the laser including an optical phase modulator for reducing the phase noise generated in the laser; and an external modulator coupled to the output of the phase modulator and for receiving a broadband analog radio frequency signal input and modulating the optical signal.

In another aspect, the present invention provides an optical transmission system for use over dispersive fiber optic links, including an optical transmitter with an analog or digital RF signal input; a semiconductor laser; a modulation circuit for externally modulating the laser, and a circuit for canceling phase modulation components of the optical associated with the noise generated by the semiconductor laser.

In another aspect of the invention, there is provided a noise cancellation circuit for reducing phase noise in the transmission of analog signals that splits an output optical signal from the external modulator of a semiconductor laser into two paths, one to a phase modulator and the other to a frequency discriminator. The phase modulation cancellation signal is adjusted in amplitude and phase to match the frequency or phase dependence of the phase noise by the laser. The phase of the signals are synchronized by a delay or phase adjustment element in one of the paths. The primary and secondary signals are then recombined by a phase modulator to produce a single optical signal having only amplitude modulation. Thus, the phase modulator modulates the primarily signal from the semiconductor laser in such a way that the resultant phase noise is minimized thus making the analog signals suitable for transmission over dispersive fiber optic links.

Additional objects, advantages and novel features of the present invention will become apparent to those skilled in the art from this disclosure, including the following detailed description as well as by practice of the invention. While the invention is described below with reference to preferred embodiments, it should be understood that the invention is not limited thereto. Those of ordinary skill in the art having access to the teachings herein will recognize additional applications, modifications and embodiments in other fields, which are within the scope of the invention as disclosed and claimed herein and with respect to which the invention could be of significant utility.

BRIEF DESCRIPTION OF THE DRAWINGS

These and other features and advantages of this invention will be better understood and more fully appreciated by reference to the following detailed description when considered in conjunction with the accompanying drawings, wherein.

Figure 1:
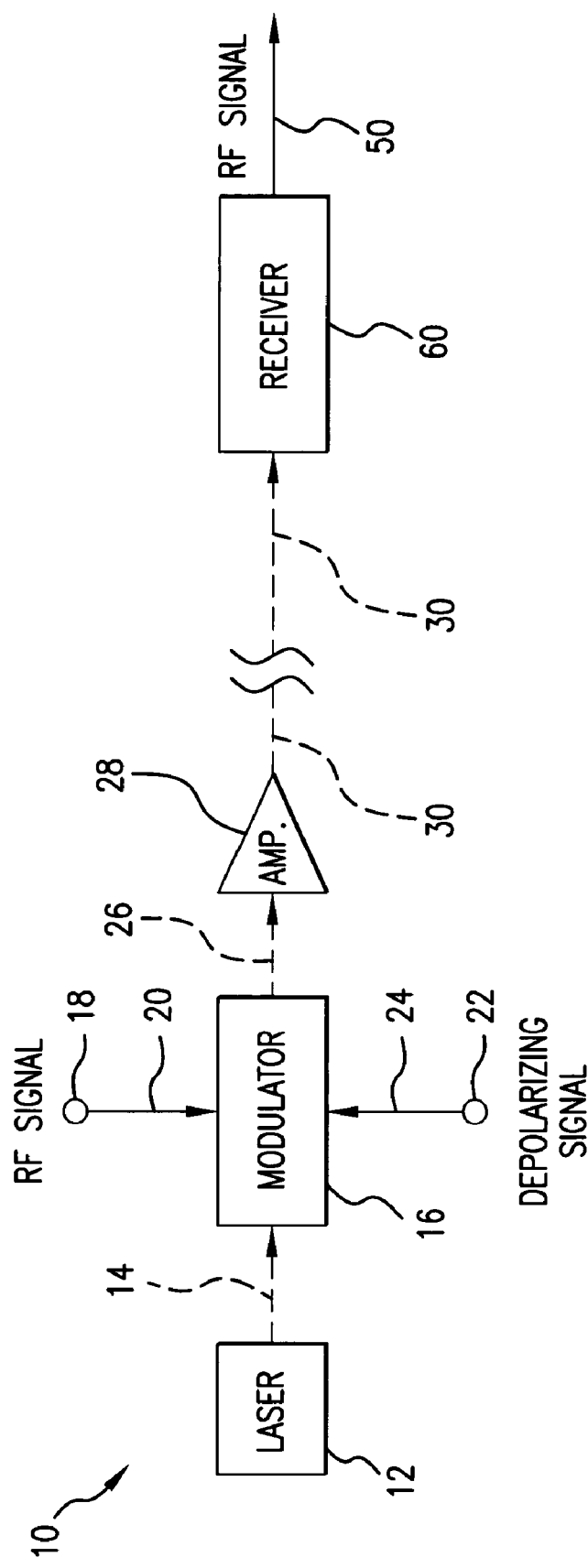
FIG. 1 is a highly simplified block diagram of an externally modulated optical transmission system as known in the prior art.

The novel features and characteristics of the invention are set forth in the appended claims. The invention itself, however, as well as other features and advantages thereof, will be best understood by reference to a detailed description of a specific embodiment, when read in conjunction with the accompanying drawings.

DETAILED DESCRIPTION OF THE PREFERRED EMBODIMENT

Details of the present invention will now be described, including exemplary aspects and embodiments thereof. Referring to the drawings and the following description, line reference numbers are used to identify like or functionally similar elements, and are intended to illustrate major features of exemplary embodiments in a highly simplified diagrammatic manner. Moreover, the drawings are not intended to depict every feature of actual embodiments nor the relative dimensions of the depicted elements, and are not drawing to scale.

FIG. 1 is a block diagram of a prior art optical transmitter as represented in U.S. Pat. No. 5,699,179 utilizing an external modulator. The transmitter, shown generally at 10, transmits an optical signal to a remote receiver 60 over an optical fiber path 30. The transmitter 10 includes a semiconductor laser 12, which produces a continuous wave (CW) output. Typical examples of such lasers are distributed feedback (DFB) laser/ or Fabry-Perot lasers, that produce an output optical beam, typically at a wavelength of 1550 nm. The unmodulated optical signal from the laser is coupled to a modulator 16 by optical fiber 14. The modulator 16 may be a single modulator such as a Mach-Zehnder modulator, a cascaded MZ modulator or more than one modulator such as in a feed-forward linearizer. The modulator 16 also receives, via terminal 18 and line 20, a broadband RF signal such as an amplitude modulated vestigial sideband (AM-SDB) cable television (CATV) or video signal. Moreover, when a feed-forward linearizer is used, a depolarizing signal is provided to the modulator 16 via terminal 22 and line 24. The depolarizing signal is used to depolarize the optical input to an error-correcting modulator (not shown) in the modulator 16.

The modulated optical signal which carries the video data is coupled by a fiber link 26 to an amplifier 28. The amplifier 28 is typically an erbium doped fiber amplifier (EDFA). The amplified optical signal is coupled to a fiber optical transmission line 30 to the receiver 60. The optical fiber transmission line 30 may be a long-distance link extending over several kilometers. In this case, line amplifiers such as EDFA 28 may be provided at spaced intervals along in the line in order to boost the signal to desired levels. At the receiver 60, an amplifier (not shown) may also be provided to boost the incoming optical signal. The boosted signal is then applied to a photodetector and demodulated at the receiver 60 to produce an electrical signal, which represents the original video or data signal at line 50.

Figure 3:
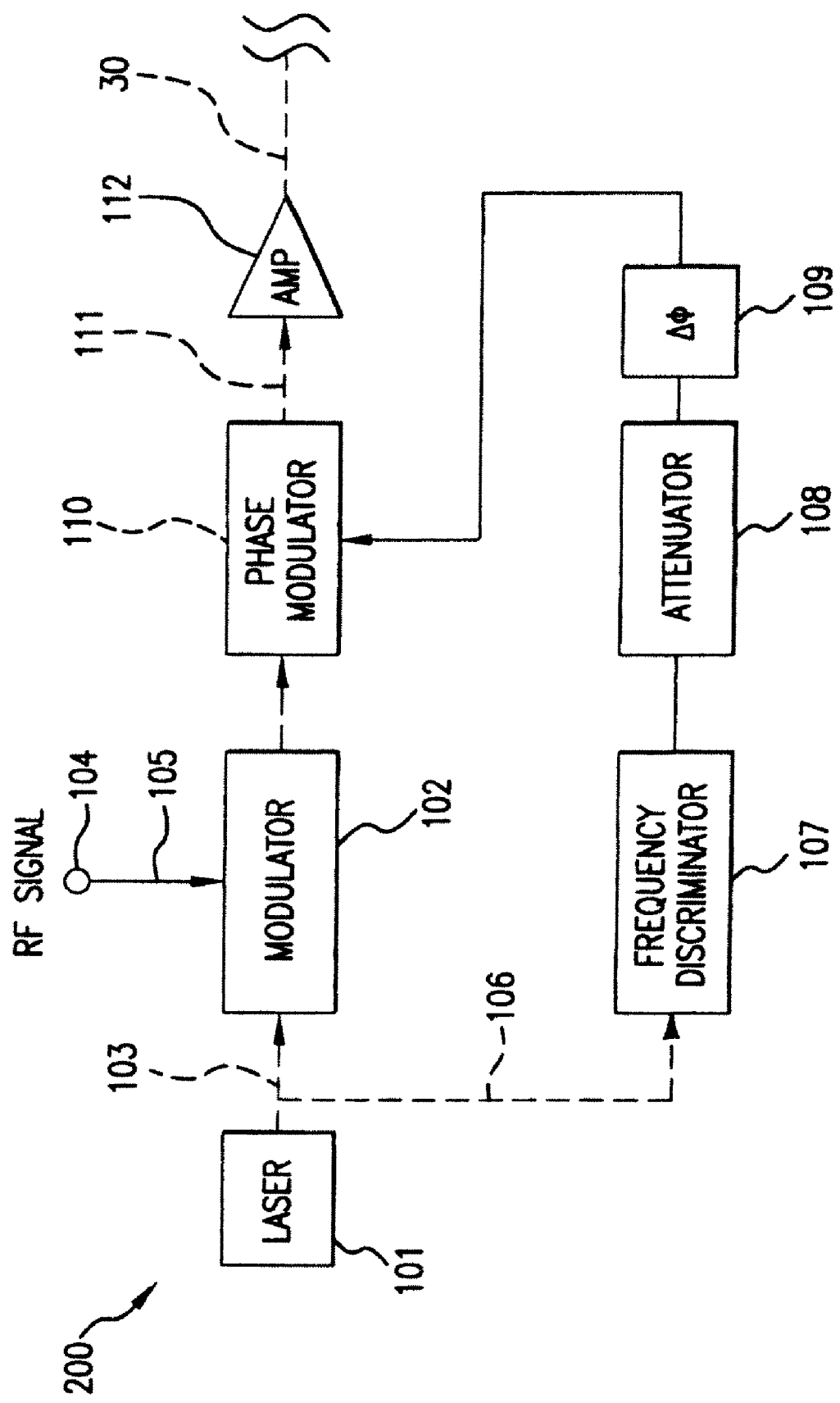
FIG. 3 is a highly simplified block diagram of a second embodiment of the optical transmission system according to the present invention.

FIG. 3 is a block diagram of an optical transmitter according to a first embodiment of the present invention utilizing an external modulator. The transmitter, shown generally at 200, transmits an optical signal to a remote receiver over an optical fiber path 30. The transmitter 200 includes a semiconductor laser 101, which produces a continuous wave (CW) output. Typical examples of such lasers are distributed feedback (DFB) laser/or Fabry-Perot lasers, that produce an output optical beam, typically at a wavelength of 1550 nm.

The edge-emitting semiconductor laser used in the system of FIG. 3 is preferably a distributed feedback laser (DFB), although a Fabry-Perot (FP) laser may be used as well. DFB lasers are the preferred approach since their optical output is primarily contained in a single lasing mode whereas the FP laser has its optical energy spread among many modes. In a preferred embodiment, the laser is an external cavity laser within the wavelength of the light output of the laser in the 1530 to 1570 nm range.

The unmodulated optical signal from the laser is split into two parts; the first part is coupled to a modulator 102 by optical fiber 103. The modulator 102 may be a single modulator such as a Mach-Zehnder modulator, a cascaded MZ modulator or more than one modulator such as in a feed-forward linearizer. The modulator 102 receives, via terminal 104 and line 105, a broadband RF signal such as an amplitude modulated vestigial sideband (AM-SDB) cable television (CATV) or video signal, or a digital signal. The analog signal may have a bandwidth greater than one octave and carry a plurality of channels. Moreover, when a feed-forward linearizer is used, a depolarizing signal is provided to the modulator similar to the arrangement of FIG. 1. The depolarizing signal is used to depolarize the optical input to an error-correcting modulator (not shown) in the modulator 102.

As noted above, the optical signal output of the laser is split into two parts: one part is applied to a modulator 102; the other part is coupled by optical fiber 106 to a frequency discriminator 107.

The output of the frequency discriminator 107 is applied to an attenuator 108 to appropriately adjust the amplitude of the signal to be commensurate with that of the phase modulated components introduced by the phase noise characteristics of the laser 101.

The output of the attenuator 108 is then connected to a phase shift circuit 109. The circuit 109 corrects for the time lag of the signal output applied to circuit elements 107, 108 compared to that signal directly applied to the modulator 102. In the video transmission band of interest (50 MHz-1000 MHz for traditional CATV systems), the phase noise of the semiconductor laser 101 is "white"; i.e., the spectral power density of the noise is independent of frequency. In this case, the phase correction path 106, 107, 108, 109 would need to have a constant (adjustable) gain with its delay precisely matched to that of the primary path 103, 102, and 110. One aspect that needs to be accounted for is the effect of the frequency discriminator 107 on the signal, specifically the result of the optical to electrical conversion process in the phase correction path. When the optical signal is detected by a photodiode, a phenomenon known as shot noise is observed. This noise results from the statistical process of absorbing a photon in the photodiode to generate an electron-hole pair. This noise is, for all practical purposes, unavoidable. Therefore, shot noise will impose a lower limit on the amount of phase noise cancellation achievable.

The output of the phase shift circuit 109 is then applied to the phase modulator 110, to thereby introduce phase corrections into the optical signal by phase modulation thereof to thereby correct or compensate for the noise generated by the laser.

The spectral noise density of the generated photocurrent from a photodiode is given as $$<i_n^2>=2eI_p$$

where e is the electron charge and $I_p$ is the DC photocurrent. One skilled in the art will immediately appreciate the fact that the noise power has a linear dependence on the received optical power and therefore the signal to noise ratio of a shot-noise dominated process improves as the received power increases. This represents a fundamental design trade-off in the proposed invention. More power tapped into the phase correction path 106, 107, 108, 109 . . . will improve the ultimate phase noise cancellation at the expense of the transmitter's optical output power.

The output of the phase modulator 110 is coupled over a fiber 111 to an amplifier 112, which is then connected to the optical fiber or link 30. At the remote end, the optical fiber or link 30 is connected to the receiver which converts the received optical signal into an RF signal, similar to that as represented in FIG. 1.

Figure 2:
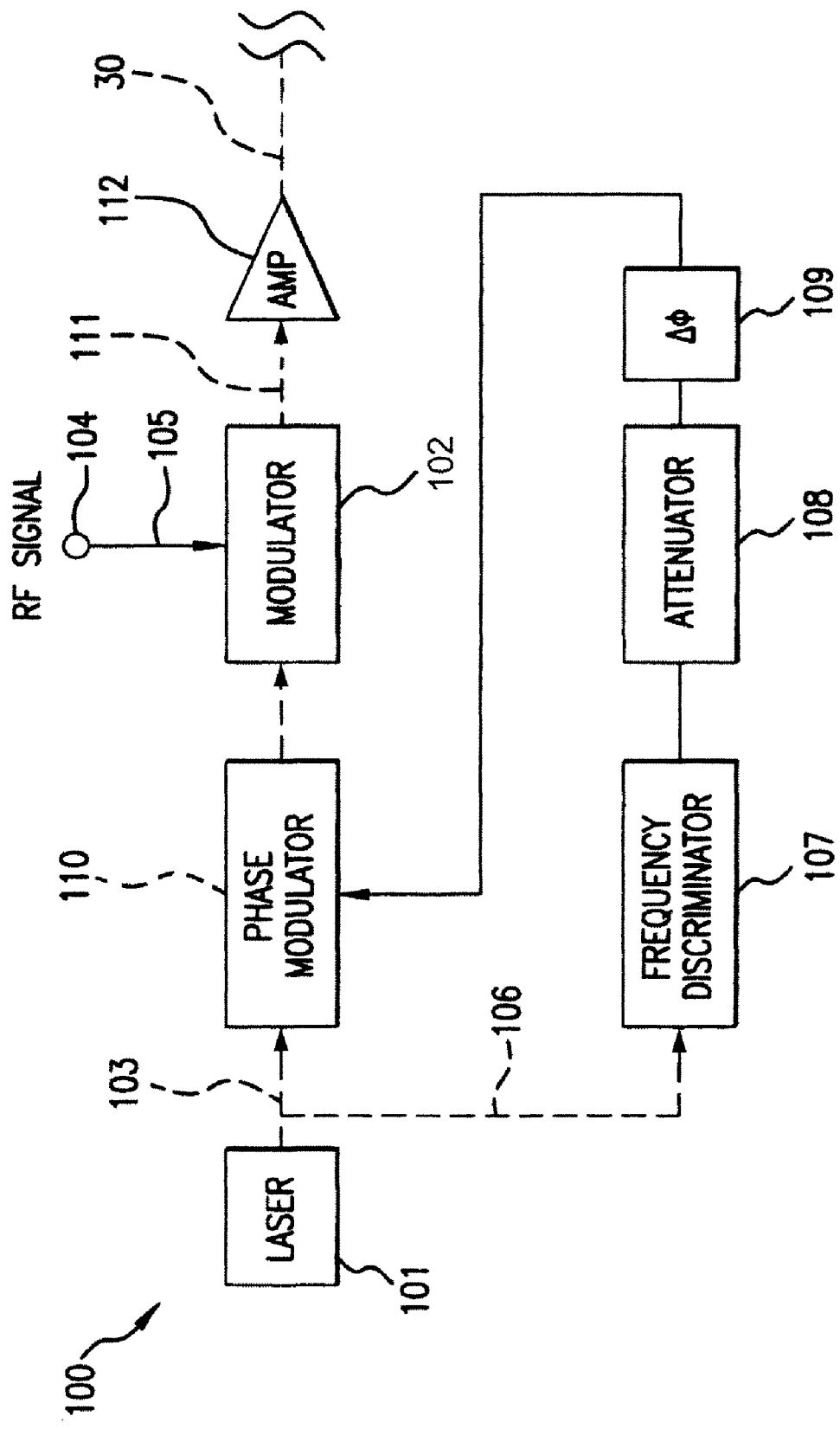
FIG. 2 is a highly simplified block diagram of a first embodiment of the optical transmission system according to the present invention.

FIG. 2 is a block diagram of an optical transmitter according to a second embodiment of the present invention utilizing an external modulator. The transmitter, shown generally at 100, transmits an optical signal to a remote receiver over an optical fiber path 30. The transmitter 100 includes a semiconductor laser 101, which produces a continuous wave (CW) output. Typical examples of such lasers are distributed feedback (DFB) laser/or Fabry-Perot lasers, that produce an output optical beam, typically at a wavelength of 1550 nm. The unmodulated optical signal from the laser is split into two parts; one is coupled to a phase modulator 110 by optical fiber 103. The phase modulator 110 introduces phase corrections into the optical signal to thereby correct or compensate for the noise generated by the laser. The CW output of the phase modulator 110 is coupled to a modulator 102, to produce a modulated information-containing optical signal.

The modulator 102 may be a single modulator such as a Mach-Zehnder modulator, a cascaded MZ modulator or more than one modulator such as in a feed-forward linearizer. The modulator 102 receives, via terminal 104 and line 105, a broadband RF signal such as an amplitude modulated vestigial sideband (AM-SDB) cable television (CATV) or video signal, or a digital signal. Moreover, when a feed-forward linearizer is used, a depolarizing signal is provided to the modulator similar to the arrangement of FIG. 1. The depolarizing signal is used to depolarize the optical input to an error-correcting modulator (not shown) in the modulator 102.

As noted above, the optical signal output of the laser is split into two parts: one part is applied to a phase modulator 110; the other part is coupled by optical fiber 106 to a frequency discrimination circuit 107.

The output of the frequency discriminator 107 is applied to an attenuator 108 to appropriately adjust the amplitude of the signal to be commensurate with that of the phase modulated components introduced by the phase noise characteristics of the laser 101.

The output of the attenuator 108 is then connected to a phase shift circuit 109. The circuit 109 corrects for the time lag of the signal output applied to circuit elements 107, 108 compared to that signal applied to the phase modulator 110. In the video transmission band of interest (50 MHz-1000 MHz for traditional CATV systems), the phase noise of the semiconductor laser 101 is "white"; i.e., the spectral power density of the noise is independent of frequency. In this case, the phase correction path 106, 107, 108, 109 would need to have a constant (adjustable) gain with its delay precisely matched to that of the primary path 103, 102, and 110. One aspect that needs to be accounted for is the frequency discriminator 107, specifically the optical to electrical conversion process in the phase correction path. When the optical signal is detected by a photodiode, a phenomenon known as shot noise is observed. This noise results from the statistical process of absorbing a photon in the photodiode to generate an electron-hole pair. This noise is, for all practical purposes, unavoidable. Therefore, shot noise will impose a lower limit on the amount of phase noise cancellation achievable.

Many variations and modifications will be apparent to those skilled in the art without departing from the spirit and scope of the invention. For example, although described and illustrated in the context of a video or multi-channel TV signal modulating a laser or light emitting diode, other non-linear devices such as amplifiers may have inherent distortion largely cancelled by this technique. The fine adjustment of the relative phase of the signals in the primary and secondary paths is in the secondary path in the illustrated embodiment, but this could also be in the primary path with the coarse adjustment. The secondary path is preferred since such a delay in the primary path may have an inappropriate impedance for this path.

Various aspects of the techniques and apparatus of the present invention may be implements in digital circuitry, or in computer hardware, firmware, software, or in combinations of them. Circuits of the invention may be implemented in computer products tangibly embodied in a machine-readable storage device for execution by a programmable processor, or on software located at a network node or web site which may be downloaded to the computer product automatically or on demand. The foregoing techniques may be performed by, for example, a single central processor, a multiprocessor, one or more digital signal processors, gate arrays of logic gates, or hardwired logic circuits for executing a sequence of signals or program of instruction to perform functions of the invention by operating on input data and generating output. The methods may advantageously be implemented in one or more computer programs that are executable on a programmable system including at least one programmable processor coupled to receive data and instructions from, and to transmit data and instructions to, a data storage system, at least one in/out device, and at least one output device. Each computer program may be implemented in a high-level procedural or object-oriented programming language, or in assembly or machine language if desired; and in any case, the language may be a complied or an interpreted language. Suitable processors include, by way of example, both general and special purpose microprocessors. Generally, a processor will receive instructions and data from read-only memory and/or random access memory. Storage devices suitable for tangibly embodying computer program instructions and data include all forms of non-volatile memory, including by way of example, semiconductor devices, such as EPROM, EEPROM, and flash memory devices; magnetic disks such as internal hard disks and removable disks; magneto-optical disks; and CD-ROM disks. Any of the foregoing may be supplemented by or incorporated in, specially designed application-specific integrated circuits (ASICS).

It will be understood that each of the elements described above, or two or more together, also may find a useful application in other types of constructions differing from the types described above.

While the invention has been illustrated and described as embodied in an optical transmission system, it is not intended to be limited to the details shown, since various modifications and structural changes may be made without departing in any way from the spirit of the present invention.

Without further analysis, from the foregoing others can, by applying current knowledge, readily adapt it embodiments of the present invention for various applications. Such adaptations should and are intended to be comprehended within the meaning and range of equivalence of the following claims.

The invention claimed is:

1. A method of reducing phase noise in a modulated optical signal output from an optical transmitter for transmission over a fiber optic link to a remote receiver, the method comprising:
   outputting a baseband optical signal from a laser, the baseband optical signal including phase noise spread over a frequency spectrum;
   detecting the baseband optical signal to determine the phase noise and to produce a noise correction electrical signal;
   modulating the baseband optical signal with an RF signal to produce a modulated information-containing optical signal;
   coupling the modulated information-containing optical signal to a phase modulator which is biased with the noise correction electrical signal; and
   modifying the modulated information-containing optical signal by reducing the phase noise associated with the baseband optical signal to produce the modulated optical signal for transmission over the fiber optic link.

2. The method of claim 1, wherein modifying the modulated information-containing optical signal comprises:
   modulating a phase of the modulated information-containing optical signal using the phase modulator controlled by the noise correction electrical signal to reduce the phase noise.

3. The method of claim 1, wherein detecting the baseband optical signal to determine the phase noise and to produce the noise correction electrical signal comprises:
   determining the phase noise with a frequency discriminator.

4. The method of claim 1, further comprising:
   splitting the baseband optical signal into a first portion routed along a primary path and a second portion routed along a feed forward noise cancellation path,
   wherein the primary path includes an amplitude modulator to perform the modulating,
   wherein the feed forward noise cancellation path includes a frequency discriminator to determine the phase noise in the baseband optical signal.

5. The method of claim 4, further comprising:
   adjusting an amplitude of the noise correction electrical signal within the feed forward noise cancellation; and
   adjusting a phase of the phase noise correction signal to compensate for a time lag difference between the primary path and the feed forward noise cancellation path.

6. The method of claim 1, wherein a wavelength of the baseband optical signal output from the laser ranges from 1530 nm to 1570 nm.

7. A method of reducing phase noise in a modulated optical signal output from an optical transmitter for transmission over a fiber optic link to a remote receiver, the method comprising:
producing a first baseband optical signal from a laser, the first baseband optical signal including noise spread over a frequency spectrum;
detecting the first baseband optical signal to determine the phase noise and to produce a noise correction electrical signal;
coupling the first baseband optical signal into a phase modulator which is biased with the noise correction electrical signal thereby reducing the phase noise in the first baseband optical signal to produce a second baseband optical signal; and
modulating the second baseband optical signal with an RF signal to produce a modulated information-containing optical signal.

8. The method of claim 7, wherein detecting the first baseband optical signal to determine the phase noise and to produce the noise correction electrical signal comprises:
determining the phase noise with a frequency discriminator.

9. The method of claim 7, further comprising:
splitting the baseband optical signal into a first portion routed along a primary path and a second portion routed along a feed forward noise cancellation path,
wherein the primary path includes the phase modulator and an amplitude modulator to perform the modulating,
wherein the feed forward noise cancellation path includes a frequency discriminator to determine the phase noise in the first baseband optical signal.

10. The method of claim 9, further comprising:
adjusting an amplitude of the noise correction electrical signal within the feed forward noise cancellation path; and
adjusting a phase of the phase noise correction signal to compensate for a time lag difference between the primary path and the feed forward noise cancellation path.

11. The method of claim 7, wherein a wavelength of the first baseband optical signal output from the laser ranges from 1530 nm to 1570 nm.

12. A method of reducing phase noise in an output optical signal output from an optical transmitter for transmission over a fiber optic link, the method comprising:
outputting a first optical signal from a laser source, the first optical signal including phase noise;
amplitude modulating the first optical signal with an information signal to generate a modulated information-containing optical signal;
generating a phase noise correction signal based on the first optical signal output from the laser source; and
combining the phase noise correction signal with the modulated information-containing optical signal to cancel at least a portion of the phase noise present in the modulated information-containing optical signal and to produce the output optical signal with reduced phase noise.

13. The method of claim 12, wherein combining the phase noise correction signal with the modulated information-containing optical signal comprises controlling a phase modulator with the phase noise correction signal.

14. The method of claim 13, wherein the phase noise correction signal comprises an electrical signal for biasing the phase modulator.

15. The method of claim 12, wherein generating the phase noise correction signal comprises:
determining the phase noise in the first optical signal with a frequency discriminator.

16. The method of claim 12, further comprising:
splitting the first optical signal into a first portion routed along a primary path and a second portion routed along a feed forward noise cancellation path,
wherein the primary path includes an amplitude modulator to perform the amplitude modulating,
wherein the feed forward noise cancellation path includes a frequency discriminator to determine the phase noise in the first optical signal.

17. The method of claim 16, wherein generating the phase noise correction signal comprises:
adjusting an amplitude of the phase noise correction signal within the feed forward noise cancellation path; and
adjusting a phase of the phase noise correction signal to compensate for a time lag difference between the primary path and the feed forward noise cancellation path.

18. The method of claim 12, wherein the first optical signal comprises a continuous wave ("CW") optical signal.

* * * * *